(12) United States Patent
Maltz et al.

(10) Patent No.: US 8,203,752 B2
(45) Date of Patent: Jun. 19, 2012

(54) PRINTER PROFILING METHODS, APPARATUS AND SYSTEMS FOR DETERMINING DEVICE AND GAIN MATRIX VALUES

(75) Inventors: Martin S. Maltz, Rochester, NY (US); Alvaro Enrique Gil, Rochester, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1058 days.

(21) Appl. No.: 12/127,728

(22) Filed: May 27, 2008

(65) Prior Publication Data

US 2009/0296109 A1 Dec. 3, 2009

(51) Int. Cl.
*H04N 1/60* (2006.01)
(52) U.S. Cl. ......... 358/1.9; 358/3.23; 358/518; 358/523
(58) Field of Classification Search ............... 358/1.1, 358/1.9, 3.23, 500, 501, 504, 518, 523, 400, 358/401, 406, 296
See application file for complete search history.

(56) References Cited

U.S. PATENT DOCUMENTS

| | | | |
|---|---|---|---|
| 5,502,579 A | | 3/1996 | Kita et al. |
| 5,502,580 A | * | 3/1996 | Yoda et al. ................. 358/518 |
| 5,636,290 A | | 6/1997 | Kita et al. |
| 6,744,531 B1 | | 6/2004 | Mestha et al. |

OTHER PUBLICATIONS

U.S. Appl. No. 11/585,463, filed Oct. 24, 2006, Mestha et al.
U.S. Appl. No. 11/959,824, filed Dec. 19, 2007, Mestha et al.
U.S. Appl. No. 12/017,746, filed Jan. 22, 2008, Mestha et al.
U.S. Appl. No. 12/127,643, filed May 27, 2008, Mestha et al.
U.S. Appl. No. 12/127,473, filed May 27, 2008, Wang et al.
U.S. Appl. No. 12/127,719, filed May 27, 2008, Gil et al.
R. Bala, "Device Characterization", Chapter 5, Digital Color Imaging Handbook, Gaurav Sharma Ed., CRC Press, 2003.
R. Balasubramanian, R. Eschbach, "Design of UCR and GCR strategies to reduce moiré in color printing", IS&TPICS Conference, pp. 390-393, 1999.
R. Balasubramanian, R. Eschbach, "Reducing multi-separation color moiré via a variable undercolor removal and gray-component replacement strategy". Journal of Imaging Science & Technology, vol. 45, No. 2, pp. 152-160, Mar./Apr. 2001.
S. Dianat, LK Mestha, A. Mathew, "Dynamic Optimization Algorithm for Generating Inverse Printer Maps with Reduced Measurements," IEEE Int. Conference on Acoustics, Speech, and Signal Processing, May 14-19, 2006, Toulouse, France.
Mestha et al., "Gray Balance Control Loop for Digital Color Printing Systems," Xerox Corporation, Sep. 18-23, 2005, Baltimore MD, 6 pages.

* cited by examiner

*Primary Examiner* — Thomas D Lee
(74) *Attorney, Agent, or Firm* — Fay Sharpe LLP

(57) ABSTRACT

This disclosure provides printer profiling methods, apparatus and systems for determining device and gain matrix values. Specifically, a method is disclosed for generating a multidimensional printer profile look-up table (LUT) for color correction. The method includes generating an initial LUT associating a plurality of colorimetric nodes with respective initial estimates of their respective device dependent color space representations and their respective gain matrix.

20 Claims, 5 Drawing Sheets

PRINTER PROFILING METHODS, APPARATUS AND SYSTEMS FOR DETERMINING DEVICE AND GAIN MATRIX VALUES

CROSS REFERENCE TO RELATED PATENTS AND APPLICATIONS

U.S. patent application Ser. No. 12/127,643, filed May 27, 2008, entitled "METHOD, APPARATUS AND SYSTEMS TO RETRIEVE GCRS FROM HISTORICAL DATABASE," by Mestha et al.;

U.S. patent application Ser. No. 12/127,719, filed May 27, 2008, entitled "COOPERATIVE NEIGHBOR PRINTING SYSTEM PROFILE METHODS AND SYSTEMS," by Gil et al.;

U.S. patent application Ser. No. 12/127,473, filed May 27, 2008, entitled "METHODS, APPARATUS AND SYSTEMS FOR BLENDING MULTIPLE GCRS," by Wang et al.; and U.S. patent application Ser. No. 12/017,746, filed Jan. 22, 2008, entitled "METHOD AND APPARATUS FOR OPTIMUM BLACK COMPONENT DETERMINATION FOR GRAY COMPONENT REPLACEMENT" by Mestha et al. are herein incorporated by reference in their entirety.

BACKGROUND

In image production systems that produce images on a recording medium, such as printers, photocopiers, facsimile machines and other xerographic devices, it is desired to control, as closely as possible, the actual perceived color of the output images. One known method to optimize image color output is to provide a look-up-table (LUT) that translates received color signals into optimized color signals for printing, for example, on a printer.

Printer profiles are used to find the device values needed to make a specified color, and are generally three dimensional colorimetric to device look up tables. An accurate way of determining the device values for the in gamut entries in the profile is to print an initial guess for the correct device values, measure the difference between printed and desired colors, and then use the gain matrix in a feedback loop operating on the printer model or on the printer to find device values that give a better approximation to the desired color. In the past, the initial device values and gain matrix were found for each desired color by doing a time consuming calculation.

It is known, for example, that in three-color spaces, such as a Cyan-Magenta-Yellow (CMY) color space, gray color is made up of equal, or near-equal amounts of each one of the colors of the three-color space. Each color in a three-color space which is made up of non-negligible amounts of all three primary colors of the color space can be viewed as having a gray component. Expanding the three-color space to include Black (K) allows then, for most colors in the color space, for a black (K) component to be added in substitution for the gray component. In such a solution, a three-input, four-output LUT is needed.

Adding black (K) as a fourth color in this manner usually saves cost, as black (K) ink is usually cheaper than colored ink, and allows more colors to be produced than were achievable with the original three primary colors. Controlled amount of black addition is considered useful for high quality printing. Having black gives better stability to prints in the presence of print variables (relative humidity, temperature, material latitude etc.). Increased gamut for dark colors is also achieved with the addition of black toner. One major disadvantage in adding black is the excessive black in flesh tones, sky tones and other important tone scales can make these tone scales appear dirty/grainy or non-uniform with black toner. However, some key colors (e.g., flesh tones and sky tones) are sensitive to the addition of black and may not be perceived as optimal if too much black is added. The replacement of the inherent gray component of colors in a three-color space with a fourth, black (K) component is called gray component replacement (GCR) or under color removal (UCR). UCR is usually used when colors are near the neutral axis, such as, for example, the L* axis in L*a*b* space or the C=M=Y axis in CMY color space, GCR is similar to UCR, but can be used with colors throughout the color gamut, not just near or at neutral axes. The use of GCR and UCR is known to facilitate the production of pleasing color outputs, optimal gamut, and to improve constraints on area coverage.

Traditionally, determination of the black (K) component in a target color system was done in an ad hoc way by experienced practitioners. This method has the disadvantages of requiring experienced personnel, being generally irreproducible, being costly, and being time-consuming.

Another method used to transform colors in a three-dimensional color space, such as CMY color space, to a four-color color space, such as CMYK color space, is to determine the black (K) component by a one dimensional function that relates the black (K) component as a one-dimensional function of the other components. In the CMY color space, for example, the function K=min (C, M, Y) can be used. This method has the disadvantages of not producing sufficiently optimized colors for the entire color gamut, especially for specialized, or key, colors such as, for example, skin tones.

In another method, a flexible method for estimating the black (K) component comprises (1) determining a maximum black (K) component, (2) adjusting the black (K) component amounts based on chroma, and (3) determining the other color components. In examples of this method, disclosed in U.S. Pat. No. 5,502,579 to Kita et al, (Kita '529) and U.S. Pat. No. 5,636,290 to Kita et al. (Kita '290), input image signals are transformed by a four-input-three output controller to L*a*b* color space. The disclosure of each of Kita '529 and Kita '290 is incorporated herein by reference in its entirety. A chroma determining means determines chroma signal C* from a* and b*. A UCR ratio calculation means calculates a UCR ratio a from the chroma signal C*. The L*a*b* and UCR ratio are then converted into the CMYK output. This method also has the disadvantages of not producing sufficiently optimized colors for the entire color gamut.

In another method, disclosed in U.S. Pat. No. 6,744,531 to Mestha et al. (Mestha), incorporated herein by reference in its entirety, consistent output across multiple devices is obtained. For a given device, received device independent image data are stored as target image data and also converted by a data adjustment subsystem to printable image data based on the color space of the device. The printable image data is printed. An image sensor senses the printed image data and outputs detected device independent image data to the data adjustment subsystem. The data adjusting subsystem compares the detected device independent image data with the stored target image data and, based on the comparison, determines adjustment factors that are used to conform the printable image data output by the data adjusting subsystem to colors mandated by the device independent image data.

In R. Bala, "Device Characterization", Chapter 5, Digital Color Imaging Handbook, Gaurav Sharma Ed., CRC Press, 2003, several methods for determining the black (K) component are reviewed. One method is black addition in which the black (K) component is calculated as a function of a scaled inverse of L*. In another method, the black (K) component is calculated as a function of the minimum value of the other color components, such as C, M, and Y for the CMY color space. In a third method, a three input-four output transform, subject to imposed constraints, is used to calculate the black (K) component. The constraints placed on the transform include requiring the sum of the color component values at a node to be less than a threshold. For example, in CMYK color space, C+M+Y+K would be constrained to be less than a threshold. A second constraint is to constrain K to be a subset of the range between the minimum and maximum allowed K values.

Another method is discussed in (1) R. Balasubramanian, R. Eschbach, "Design of UCR and GCR strategies to reduce moire in color printing", IS&TPICS Conference, pp. 390-393 (1999) and (2) R. Balasubramanian, R. Eschbach, "Reducing multi-separation color moire via a variable undercolor removal and gray-component replacement strategy", Journ. Imaging Science & Technology, vol. 45, no. 2, pp. 152-160, March/April, 2001. A UCR/GCR strategy is proposed that is optimized to reduce moire. In this method, the UCR/GCR strategy is to characterize moire as a function of the color components and to select optimized output color components when the moire function is minimized.

INCORPORATION BY REFERENCE

The following patent applications are totally incorporated herein by reference.

U.S. patent application Ser. No. 11/959,824, filed Dec. 19, 2007, entitled "METHOD FOR CLASSIFYING A PRINTER GAMUT INTO SUBGAMUTS FOR IMPROVED SPOT COLOR ACCURACY," by Mestha et al.

BRIEF DESCRIPTION

In one aspect of this disclosure, a method for generating a multidimensional look-up table (LUT) for color correction is disclosed. The method disclosed comprises a) receiving a plurality of target color signals defining a respective plurality of target color nodes in a multidimensional device independent color space; b) generating for each of the nodes an initial estimate of a respective multidimensional device dependent color space representation; c) generating for each of the nodes a respective multidimensional gain matrix, the gain matrix providing one or more gain functions associated with each node to provide a calculated multidimensional corrected device dependent color space representation of a target color as a function of the initial estimate of the respective multidimensional device dependent color space representation, and a color error associated with initial estimate of the respective multidimensional device dependent color space representation relative to the respective target color; d) generating an initial multidimensional printer profile LUT by associating each of the plurality of target color nodes with the respective initial estimate of the device dependent color space representation and the respective gain matrix; and e) generating a final multidimensional printer profile LUT based on the initial multidimensional printer profile LUT by performing one or more iterations to generate calculated device dependent color space representations of the target color signals and associating the calculated device dependent color representations with the respective nodes of the final multidimensional printer profile LUT.

In another aspect of this disclosure, a printing apparatus controller is disclosed. The printing apparatus controller comprises a computer-usable data carrier storing instructions that, when executed by the controller, cause the controller to perform a method for generating a multidimensional look-up table for color correction, the method comprising a) receiving a plurality of target color signals defining a respective plurality of target color nodes in a multidimensional device independent color space; b) generating for each of the nodes an initial estimate of a respective multidimensional device dependent color space representation; c) generating for each of the nodes a respective multidimensional gain matrix, the gain matrix providing one or more gain functions associated with each node to provide a calculated multidimensional corrected device dependent color space representation of a target color as a function of the initial estimate of the respective multidimensional device dependent color space representation, and a color error associated with initial estimate of the respective multidimensional device dependent color space representation relative to the respective target color; d) generating an initial multidimensional printer profile LUT by associating each of the plurality of target color nodes with the respective initial estimate of the device dependent color space representation and the respective gain matrix; and e) generating a final multidimensional printer profile LUT based on the initial multidimensional printer profile LUT by performing one or more iterations to generate calculated device dependent color space representations of the target color signals and associating the calculated device dependent color representations with the respective nodes of the final multidimensional printer profile LUT.

In still another aspect of this disclosure a printing system is disclosed. The printing system comprises a color printing device configured to receive data representative of a color image to be marked on a media substrate; and a controller operatively connected to the color printing device, the controller configured to 1) access an initial multidimensional printer profile LUT associating a plurality of calorimetric nodes with respective initial device dependent color space data representations and respective gain matrixes, and 2) a final multidimensional printer profile LUT including device independent color space to device dependent color space transformations calculated by using the initial device dependent color space data representations and gain matrixes, wherein the controller accesses the final printer profile LUT to provide device dependent color space data representations of the color image to the color printing device for marking on the media substrate.

DETAILED DESCRIPTION

As briefly discussed in the background section, printer profiles are used to generate device dependent color space representations of a colorimetric device independent color space. For example, a printer may be represented in a three dimensional color space, such as CMY, or a four dimensional color space, such as CMYK. The printer profile transforms a calorimetric device independent color space, for example L*a*b*, etc. to the device dependent color space, for example CMYK. Notably, the embodiments of this disclosure are not limited to any particular multidimensional color space, and may include, but not limited to, CMY, CMYK, RGB, L*a*b*.

Substantively, the methods, apparatus, and systems disclosed provide a multidimensional printer profile LUT for color correction. The LUT is generated by a method wherein a plurality of target colors associated with a grid, for example, are received by a controller and each target color is associated with a node of a color space, for example, the device independent color space L*a*b*. Notably, the L*a*b* color space may also be referred to as Lab and LAB throughout this disclosure.

Subsequently, an initial LUT is generated which includes estimates/initial device dependent color space representations of the target color nodes, for example, the CMYK color space, which includes a GCR strategy. In addition, the initial LUT includes a gain function for each target color node to enable a controller implemented algorithm to iteratively correct for any difference between a requested color and the actual rendered/printed or estimated color based on the device dependent color space representations.

In addition to the initial LUT, a final multidimensional printer profile LUT (i.e., ICC Profile) is generated based on the initial LUT and the newly found ΔCMYK through iteration on the printer or the printer model. The final printer profile LUT is the profile used by a controller to output specific device dependent color space data to a printer to mark a substrate with the requested color. Notably, the final device dependent color space values are iteratively calculated by using the initial LUT device dependent color space representations and respective gain matrixes associated with a respective requested marking color.

The discussion which follows primarily focuses on a L*a*b* (Lab) device independent color space and a CMYK device dependent color space. As stated previously, these embodiments are not limited to a particular color space.

Figure 6:
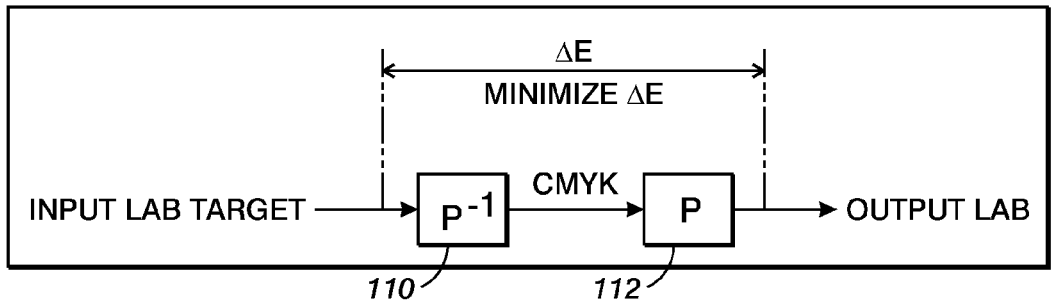
FIG. 6 is a diagram showing a color matching minimization process control algorithm for a color printing system according to an exemplary embodiment of this disclosure.

By way of additional background, FIG. 6 is a control system block diagram illustrating the overall process control associated with a color printing device. The control system includes a printer profile 110, also referred to as an inverse printer model, and a printer model 112. Alternatively, P 112 could represent an actual printer.

In operation, a Lab target color is received by the printer profile 110 which generates the respective CMYK value by accessing a Lab→CMYK function or LUT. Next, the CMYK value is received by the printer model 112 (note, 112 could also be a printer) which generates a Lab output representative of the color output of the profiled printer. The objective of the control system is to minimize ΔE which represents the error difference between the input Lab and output Lab.

Figure 7:
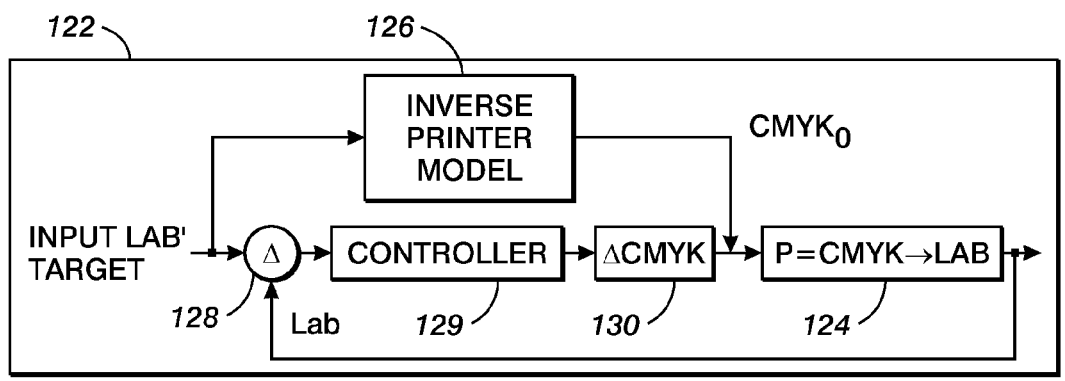
FIG. 7 is a model diagram showing a processing algorithm matching target L*a*b* spot colors to printer output colors.

With reference to FIG. 7, illustrated is a control system block diagram for controlling the CMYK associated with an input/target Lab.

The control system 122 includes a controller 129, a GCR constrained inverse printer model 126, a Δ CMYK process 130, a comparator 128, and a CMYK→Lab 124 process associated with a printer, for example, an image sensor or scanner which generates a Lab representation of the CMYK output or a printer model that estimates the Lab values. The output of the GCR constrained inverse printer model 126 is $CMYK_0$, where the $CMYK_0$ values are in the initial LUT generated by, for example, one of the processes disclosed in U.S. patent application Ser. No. 12/127,643, filed May 27, 2008, entitled "METHOD, APPARATUS AND SYSTEMS TO RETRIEVE GCRS FROM HISTORICAL DATABASE," by Mestha et al. and U.S. patent application Ser. No. 12/017,746, filed Jan. 22, 2008, entitled "METHOD AND APPARATUS FOR OPTIMUM BLACK COMPONENT DETERMINATION FOR GRAY COMPONENT REPLACEMENT" by Mestha et al.

In operation, an input Lab color target is received by the GCR constrained inverse printer model 126, which generates the initial CMYK which is subsequently printed and measured or estimated using a printer model 124 to produce a corresponding Lab value. This measured or estimated Lab value is compared 128 to the target Lab and the error signal is fed to controller 129. Controller 129 generates a Δ CMYK to add to the GCR constrained inverse model 126 generated CMYK and the new CMYK is again printed and measured or estimated to generate a corresponding Lab value. This process is iteratively repeated to converge on a Lab→CMYK profile within a acceptable margin of error.

According to this disclosure and embodiments contained therein, initial device values (e.g., CMYK) and gain matrices are determined for a rectangular grid corresponding to each grid node in some calorimetric space (LAB, for example) a priori using offline calculations and stored in a multidimensional lookup table with calorimetric input. The initial device values and gain matrix required for any other desired color can therefore be found using this table, interpolating if necessary. The embodiments also may use a single file data structure to carry the device values and gain matrices in the product solution. The embodiments have been reduced to practice and tested for application to produce high accuracy profiles.

As previously discussed, printer profiles are used to find the device values needed to make a specified color, and are generally three dimensional calorimetric to device look up tables. For specificity in this discussion, we will use an L*a*b* calorimetric and a CMYK device space, though other color spaces could be used. These tables are generally of the order of 33×33×33 levels or smaller, so interpolation is used for finding the device values for input colors not on the nodes. These tables may be used for processing images with tens of millions of pixels, so the interpolation method should be simple and fast. The nodes therefore may be on a rectangular grid to make it easy to find the sub-cube that contains the desired color, and some variation of linear interpolation between the device values at the corners of this sub-cube is used to find the device values for the desired color.

A controls based approach can be used to find the CMYK values for the in gamut nodes of the profile. An initial CMYK value and gain matrix (G) is found for each desired color, and the initial CMYK value is printed on the real or virtual (i.e. printer model) printer. A new CMYK value is then found using the equation:

$$CMYK' = CMYK + G*(LABd - LABe) \qquad (1)$$

where CMYK is the old CMYK value, CMYK' is an improved estimate, LABe is the color printed or estimated with CMYK, and LABd is the desired color. This process is iterated as necessary.

A lengthy and sophisticated calculation is sometimes required to find the initial CMYK and gain matrix values for a desired color. One of the approaches used for determining the initial CMYK values require adding restrictions of K separation to avoid excessive use of black in regions where it is not desired (e.g., flesh tones). See U.S. patent application Ser. No. 12/017,746, filed Jan. 22, 2008, entitled "METHOD AND APPARATUS FOR OPTIMUM BLACK COMPONENT DETERMINATION FOR GRAY COMPONENT REPLACEMENT," to Mestha et al. for more details. Therefore, it is not desirable to have to redo this calculation when, for example, the response of the printer changes so that colors that were originally out of gamut move inside the gamut. In addition, it may also be desirable to find the CMYK values for a color not on the original LAB grid with higher accuracy than can normally be obtained by interpolation between the nodes of the profile. For example, there are regions of color space— i.e. saturated yellows—where interpolation introduces errors that may not be acceptable. Therefore, it is desirable to find the initial CMYK and gain matrix for this color without doing a lengthy calculation.

To avoid this problem, the initial CMYK values and gain matrix elements are put in a multidimensional lookup table. For example, the name of this table is generally something like krData.lut and the table has three inputs ($L^*$, $a^*$, and $b^*$) and 16 outputs, i.e., the initial CMYK values, and the 12 entries in the gain matrix for a 4 separation color printer. By using a multidimensional LUT, initial CMYK and gain matrix values can also be found for any color by interpolation. The point is that this interpolation process does not have to be extremely accurate. The interpolated initial CMYK and gain matrix values only have to be accurate enough to make the iterative application of Equation 1 converge.

The initial CMYK and gain matrix calculations can be derived from a printer model that describes a printer in its nominal state. However, initial CMYK and gain matrix values need to be found for all possible states of this printer, including ones which include colors that the printer cannot make in its nominal state. This can be done by extrapolation, either in the krData.lut table, or in the printer model. If the interpolation is done in the printer model, some of the initial CMYK values will be outside the 0-255 range. This is not a problem, however, since Eq. 1 can easily drive CMYK' out of the 0-255 range, and the iterative algorithm can cope with this by clipping it to the 0-255 range and printing.

One benefit of the data structure disclosed is for incorporating different GCR/UCR approaches. For example, a maximum black solution using gamut classification described in U.S. patent application Ser. No. 11/959,824, filed Dec. 19, 2007, entitled "METHOD FOR CLASSIFYING A PRINTER GAMUT INTO SUBGAMUTS FOR IMPROVED SPOT COLOR ACCURACY," by Mestha et al. may be desired for some printing applications. The three gamut class solution requires the use of different gain matrices and initial device values. These and other extensions to multiple GCR/UCR combinations can be comprehended within the single file data structure proposed.

The approaches, according to one exemplary embodiment of this disclosure discussed herein, have been validated.

Figure 1:
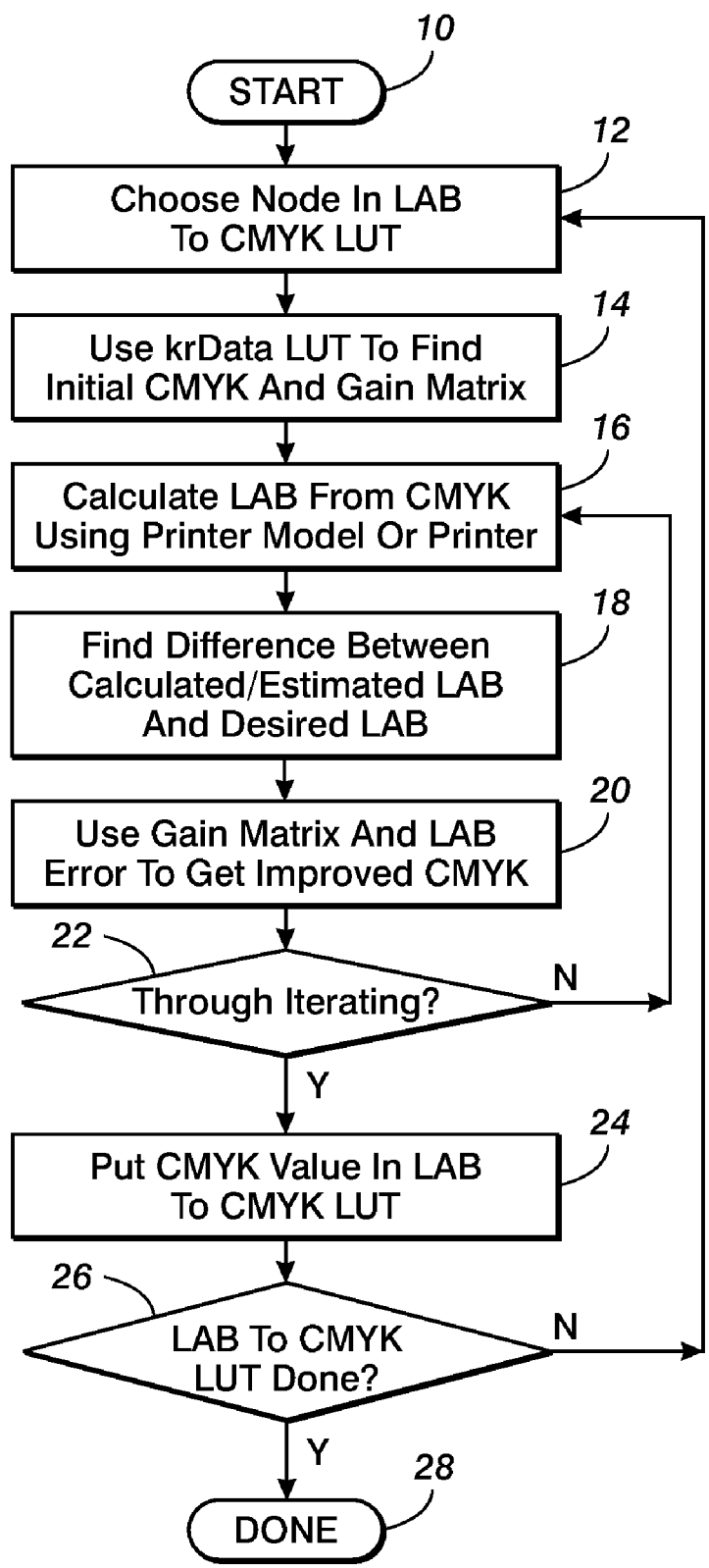
FIG. 1 illustrates a method for generating a multidimensional printer profile LUT according to an exemplary embodiment of this disclosure.

With reference to FIG. 1, illustrated is a flow chart detailing a process of generating a multidimensional printer profile LUT according to an exemplary embodiment of this disclosure.

Initially, the process starts 10 and step 12 chooses a node in the Lab to CMYK LUT.

Next 14, the process uses krData LUT to find initial CMYK and gain matrix values.

Next 16, the process calculates Lab from CMYK using a printer model or printer.

Next 18, the process finds the difference between the calculated or estimated Lab and the desired Lab.

Next 20, the process uses the gain matrix and Lab error to generate an improved CMYK.

Next 22, the process makes a determination if the steps 16, 18 and 20 need to be repeated based on the Lab error. If no additional iterations are necessary, the process puts 24 the CMYK value in the final Lab to CMYK LUT.

Next 26, the process repeats steps 12, 14, 16, 18, 20, 22 and 24 for other target color nodes until the LUT is complete.

Then 28, the process ends.

Figure 2:
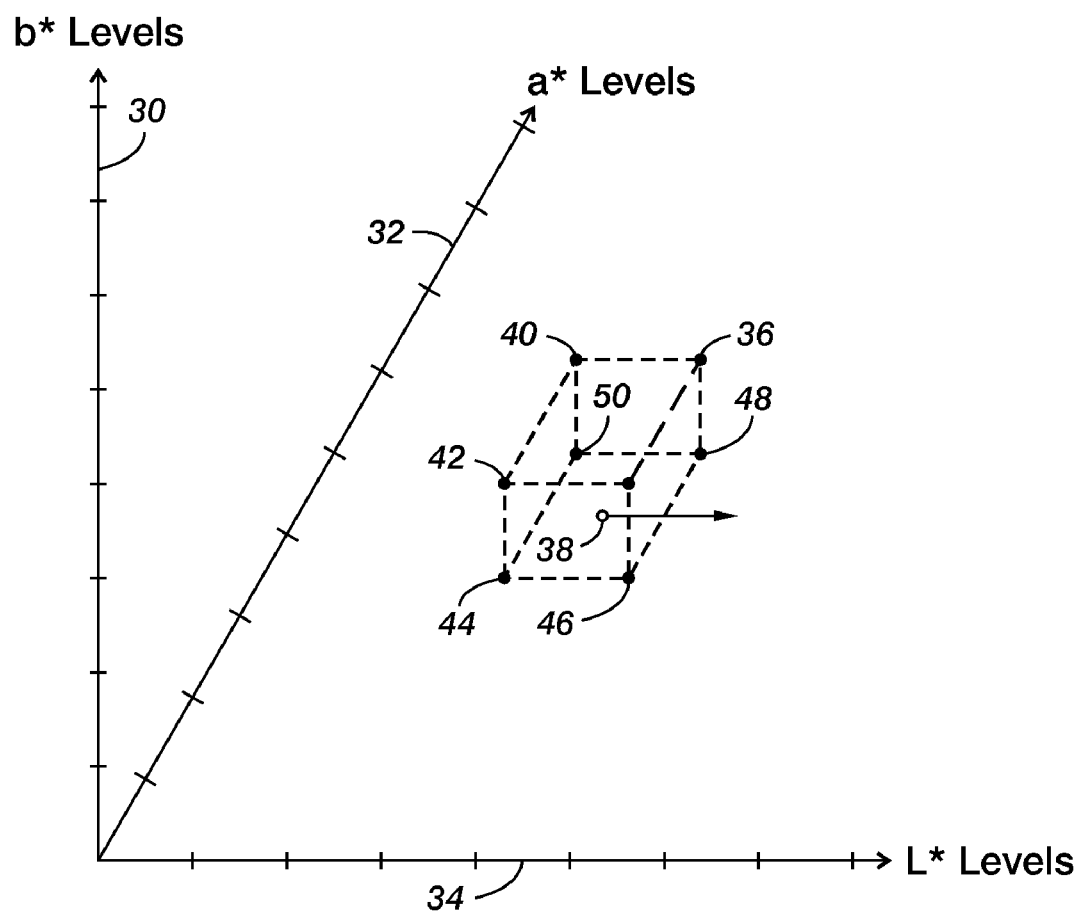
FIG. 2 illustrates the structure of a multidimensional printer profile LUT according to an exemplary embodiment of this disclosure.

With reference to FIG. 2, illustrated is the cube structure associated with the printer profile Lab nodes discussed with reference to FIG. 1. In addition, the process of interpolating between nodes is pictorially indicated.

The profile LUT of FIG. 2 is in $L^*a^*b^*$ space, which includes a $L^*$ axis 34, an $a^*$ axis 32 and a $b^*$ axis 30. A plurality of target color nodes are represented as 36, 40, 42, 44, 46, 48, and 50. Each of these nodes corresponds to a unique Lab value, i.e., unique target color. Moreover, these nodes, together shown as a cube for convenience, but may not necessarily be a cube in $L^*a^*b^*$ space. As discussed previously, each node of the LUT corresponds to a specific CMYK transformation from the respective Lab value.

As is apparent from FIG. 2, if a requested Lab color corresponds directly with a node, for example, node 40, the control process retrieves the corresponding CMYK value from the LUT. Alternatively, if a requested target color does not directly correspond to a node, for example, node 38, the control process interpolates between two or more nodes defining the cube surrounding node 38.

Figure 3:
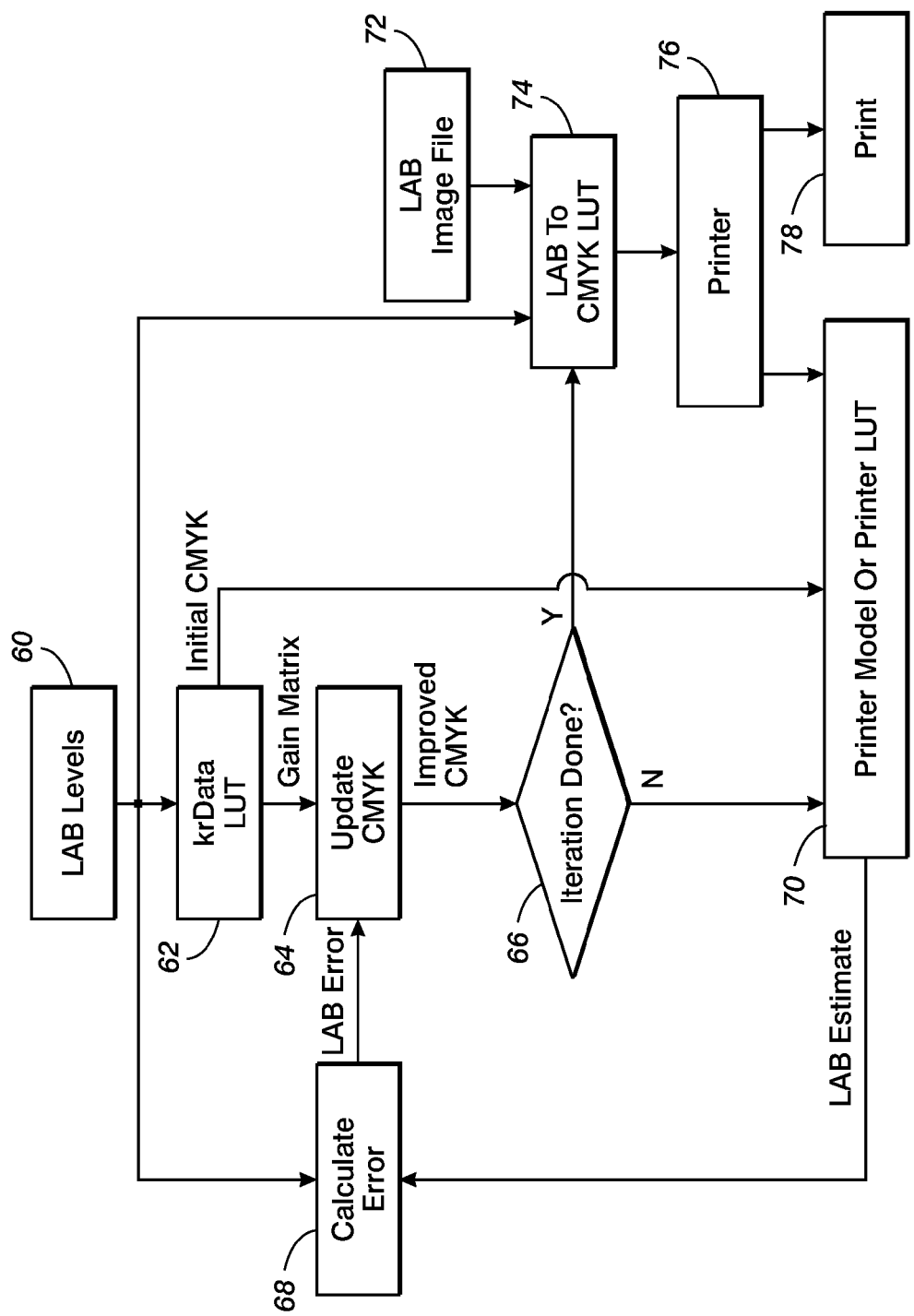
FIG. 3 schematically illustrates a printing system including a multidimensional printer profile LUT according to an exemplary embodiment of this disclosure.

With reference to FIG. 3, illustrated is a block diagram of a printing apparatus/system according to an exemplary embodiment of this disclosure.

The system includes a Lab image file 72 to be reproduced which may be obtained by transforming RGB images to Lab coordinate space using a multidimensional LUT, RGB→Lab, a final Lab to CMYK LUT 74, a printer 76 and an outputted print 78. In operation, the Lab image file 72 is converted to CMYK values by the Lab to CMYK LUT and the CMYK values provide the necessary control parameter for the Cyan-Magenta-Yellow-Black marking subsystems of the printer 76 to generate a print 78 of the original Lab image file 72.

The system used to generate the final Lab to CMYK LUT 74 includes a plurality of target color Lab levels 60, a krData LUT 62, an updating CMYK process 64, an iteration process control 66, a printer model or printer LUT 70, and an error calculator 68.

In operation, the Lab levels 60 are used to generate the krData LUT as discussed with reference to FIG. 1, which includes initial CMYK values and respective gain matrixes. Iterations are performed to update the final Lab to CMYK LUT with improved/converged CMYK values for the target Lab colors/levels 60 within an error threshold.

Figure 4:
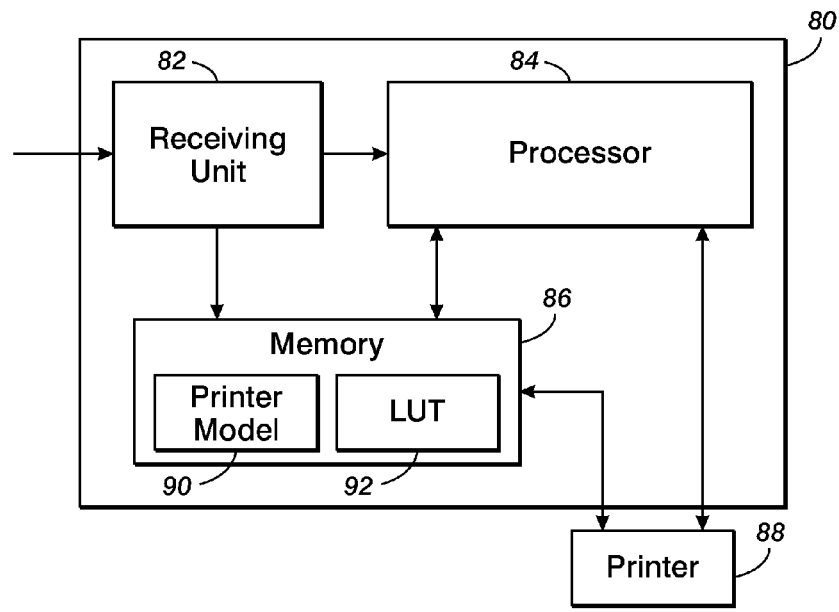
FIG. 4 illustrates a block diagram of a printing system according to an exemplary embodiment of this disclosure.

With reference to FIG. 4, illustrated is a hardware block diagram of a system for implementing an exemplary process as described heretofore. The system 80 includes a receiving unit 82, a processor 84, a computer data memory 86 and a printer 88. The receiving unit may be configured to receive data representative of the plurality of target colors in Lab and/or RGB, and be operatively connected to a scanner. The memory unit 86 includes data representative of a printer model and a LUT 92. Notably, the system will include an initial LUT and a final profile LUT as previously discussed.

Figure 5:
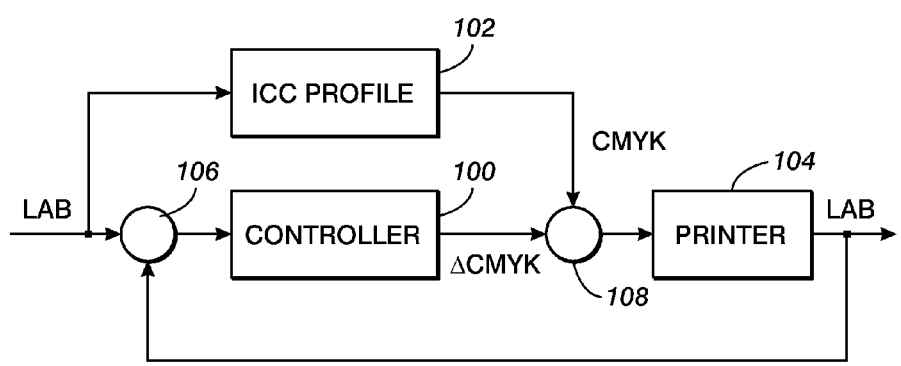
FIG. 5 schematically illustrates a printer control system according to an exemplary embodiment of this disclosure.

With reference to FIG. 5, illustrated is an overall process control schematic to illustrate the operation of a printing apparatus/system according to an exemplary embodiment of this disclosure.

The apparatus/system includes a controller 100, an ICC profile 102, a printer 104, a comparator 106 and an integrator 108. In operation, a Lab image file is inputted to the ICC profile, i.e., final multidimensional profile LUT, which generates the respective CMYK values for ripping in the printer 104. Periodically, Lab measurements of the printer 104 output are measured or estimated, relative to a target Lab color input and the controller 100 receives an error input from comparator 106. The controller 100 generates a Δ CMYK value to adjust the output of ICC profile at integrator 108. This process can be iteratively performed to update the ICC profile as the operating characteristics of the printer change over time and as a result of environmental operating conditions.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer implemented method of generating a multidimensional printer profile look-up table (LUT) for color correction, the method comprising:
   a) receiving a plurality of target color signals defining a respective plurality of target color nodes in a multidimensional device independent color space;
   b) generating for each of the nodes an initial estimate of a respective multidimensional device dependent color space representation;
   c) generating for each of the nodes a respective multidimensional gain matrix, the gain matrix providing one or more gain functions associated with each node to provide a calculated multidimensional corrected device dependent color space representation of a target color as a function of the initial estimate of the respective multidimensional device dependent color space representation, and a color error associated with initial estimate of the respective multidimensional device dependent color space representation relative to the respective target color;
   d) generating an initial multidimensional printer profile LUT by associating each of the plurality of target color nodes with the respective initial estimate of the device dependent color space representation and the respective gain matrix; and
   e) generating a final multidimensional printer profile LUT based on the initial multidimensional printer profile LUT by performing one or more iterations to generate calculated device dependent color space representations of the target color signals and associating the calculated device dependent color representations with the respective nodes of the final multidimensional printer profile LUT.

2. The computer implemented method of generating a multidimensional printer profile LUT for color correction according to claim 1, step e) comprising:
   generating a calculated device independent color space representation of the estimated device dependent color space representation associated with a first target color node using a printer model or printer;
   generating a color error associated with the difference between the first target color node and the calculated device independent color space representation;
   generating a calculated device dependent color space representation of the first target color node as a function of the color error and gain matrix associated with the first target color node; and
   updating the final printer profile LUT to associate the calculated device dependent color space representation of the first target color node with the respective target color node.

3. The computer implemented method of generating a multidimensional printer profile LUT according to claim 1, wherein the device independent color space is L*a*b* and the device dependent color space is CMYK.

4. The computer implemented method of generating a multidimensional printer profile LUT according to claim 3, wherein the gain matrix is generated by calculating values for ∂C/∂L*, ∂C/∂a*, ∂C/∂b*, ∂M/∂L*, ∂M/∂a*, ∂M/∂b*, ∂Y/∂L*, ∂Y/∂a*, ∂Y/∂b*, ∂K/∂L*, ∂K/∂a*, and ∂K/∂b*.

5. The computer implemented method of generating a multidimensional printer profile LUT according to claim 1, comprising:
   receiving an additional target color signal not defined as a target color node in step a);
   interpolating two nodes defined in step a) to generate an initial estimate of a respective multidimensional device dependent color space representation and a respective multidimensional gain matrix; and
   updating the final multidimensional printer profile LUT by performing one or more iterations to generate a respective calculated device dependent color space representation of the additional target color signal and associating the respective calculated device dependent color representation with the respective additional color signal.

6. The computer implemented method of generating a multidimensional printer profile LUT according to claim 5, wherein the additional target color signal is within the gamut of the initial multidimensional LUT.

7. The computer implemented method of generating a multidimensional printer profile LUT according to claim 1, comprising:
   receiving an additional target color signal not defined as a target color node in step a);
   extrapolating two nodes defined in step a) to generate an initial estimate of a respective multidimensional device dependent color space representation and a respective multidimensional gain matrix; and
   updating the final multidimensional printer profile LUT by performing one or more iterations to generate a respective calculated device dependent color space representation of the additional target color signals and associating the respective calculated device dependent color representation with the respective additional color signal.

8. The computer implemented method of generating a multidimensional printer profile LUT according to claim 7, wherein the additional target color signal is outside the gamut of the initial multidimensional printer profile LUT.

9. The computer implemented method of generating a multidimensional printer profile LUT according to claim 1, wherein step b) generates an initial estimate of the respective device dependent color space representations using one of a K-restricted GCR, medium GCR, maximum GCR, and a 3 gamut classes GCR.

10. A printing apparatus controller comprising:
    a computer-usable non-transitory data carrier storing instructions that, when executed by the controller, cause the controller to perform a method for generating a multidimensional printer profile look-up table for color correction, the method comprising:

a) receiving a plurality of target color signals defining a respective plurality of target color nodes in a multidimensional device independent color space;
b) generating for each of the nodes an initial estimate of a respective multidimensional device dependent color space representation;
c) generating for each of the nodes a respective multidimensional gain matrix, the gain matrix providing one or more gain functions associated with each node to provide a calculated multidimensional corrected device dependent color space representation of a target color as a function of the initial estimate of the respective multidimensional device dependent color space representation, and a color error associated with initial estimate of the respective multidimensional device dependent color space representation relative to the respective target color;
d) generating an initial multidimensional printer profile LUT by associating each of the plurality of target color nodes with the respective initial estimate of the device dependent color space representation and the respective gain matrix; and
e) generating a final multidimensional printer profile LUT based on the initial multidimensional printer profile LUT by performing one or more iterations to generate calculated device dependent color space representations of the target color signals and associating the calculated device dependent color representations with the respective nodes of the final multidimensional printer profile LUT.

11. The printing apparatus controller according to claim 10, step e) comprising:
generating a calculated device independent color space representation of the estimated device dependent color space representation associated with a first target color node using a printer model or printer;
generating a color error associated with the difference between the first target color node and the calculated device independent color space representation;
generating a calculated device dependent color space representation of the first target color node as a function of the color error and gain matrix associated with the first target color node; and
updating the final printer profile LUT to associate the calculated device dependent color space representation of the first target color node with the respective target color node.

12. The printing apparatus controller according to claim 10, wherein the device independent color space is L*a*b* and the device dependent color space is CMYK.

13. The printing apparatus controller according to claim 12, wherein the gain matrix is generated by calculating values for $\partial C/\partial L^*$, $\partial C/\partial a^*$, $\partial C/\partial b^*$, $\partial M/\partial L^*$, $\partial M/\partial a^*$, $\partial M/\partial b^*$, $\partial Y/\partial L^*$, $\partial Y/\partial a^*$, $\partial Y/\partial b^*$, $\partial K/\partial L^*$, $\partial K/\partial a^*$, and $\partial K/\partial b^*$.

14. The printing apparatus controller according to claim 10, the method comprising:
receiving an additional target color signal not defined as a target color node in step a);
interpolating two nodes defined in step a) to generate an initial estimate of a respective multidimensional device dependent color space representation and a respective multidimensional gain matrix; and
updating the final multidimensional printer profile LUT by performing one or more iterations to generate a respective calculated device dependent color space representation of the additional target color signal and associating the respective calculated device dependent color representation with the respective additional color signal.

15. The printing apparatus controller according to claim 14, wherein the additional target color signal is within the gamut of the initial multidimensional printer profile LUT.

16. The printing apparatus controller according to claim 10, the method comprising:
receiving an additional target color signal not defined as a target color node in step a);
extrapolating two nodes defined in step a) to generate an initial estimate of a respective multidimensional device dependent color space representation and a respective multidimensional gain matrix; and
updating the final multidimensional printer profile LUT by performing one or more iterations to generate a respective calculated device dependent color space representation of the additional target color signals and associating the respective calculated device dependent color representation with the respective additional color signal.

17. The printing apparatus controller according to claim 16, wherein the additional target color signal is outside the gamut of the initial multidimensional printer profile LUT.

18. The printing apparatus controller according to claim 10, wherein step b) generates an initial estimate of the respective device dependent color space representations using one of a K-restricted GCR, a medium GCR, a maximum GCR and a 3 gamut classes GCR.

19. A printing system comprising:
a color printing device configured to receive data representative of a color image to be marked on a media substrate; and
a controller operatively connected to the color printing device, the controller configured to 1) access an initial multidimensional LUT associating a plurality of colorimetric nodes, each node associated with a respective initial device dependent color space data representations and a respective gain matrix, and the controller configured to 2) access a final multidimensional printer profile LUT including device independent color space to device dependent color space transformations associated with each of the plurality of colorimetric nodes calculated by using the initial device dependent color space data representation and respective gain matrix for each of the plurality of nodes, wherein the controller is configured to access the final multidimensional printer profile LUT to provide device dependent color space data representations of the color image to the color printing device for marking on the media substrate.

20. The printing system according to claim 19, wherein the device independent color space is L*a*b*, the device dependent color space is CMYK, and the gain matrix is generated by calculating values for $\partial C/\partial L^*$, $\partial C/\partial a^*$, $\partial C/\partial b^*$, $\partial M/\partial L^*$, $\partial M/\partial a^*$, $\partial M/\partial b^*$, $\partial Y/\partial L^*$, $\partial Y/\partial a^*$, $\partial Y/\partial b^*$, $\partial K/\partial L^*$, $\partial K/\partial a^*$, and $\partial K/\partial b^*$.

* * * * *